(12) United States Patent
McQuaide, Jr.

(10) Patent No.: US 8,161,290 B2
(45) Date of Patent: Apr. 17, 2012

(54) SECURITY FOR A PERSONAL COMMUNICATION DEVICE

(75) Inventor: Arnold Chester McQuaide, Jr., Berkeley Lake, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1029 days.

(21) Appl. No.: 11/458,289

(22) Filed: Jul. 18, 2006

(65) Prior Publication Data

US 2008/0034217 A1    Feb. 7, 2008

(51) Int. Cl.
*G06F 21/00*    (2006.01)
(52) U.S. Cl. .............................. 713/186; 713/150; 726/2
(58) Field of Classification Search ........... 713/182–186
See application file for complete search history.

(56) References Cited

U.S. PATENT DOCUMENTS

| | | | |
|---|---|---|---|
| 6,990,588 B1 * | 1/2006 | Yasukura | 713/186 |
| 7,069,585 B1 * | 6/2006 | Chess et al. | 726/9 |
| 2003/0191836 A1 * | 10/2003 | Murtha et al. | 709/224 |
| 2006/0182276 A1 * | 8/2006 | Sandhu et al. | 380/44 |

* cited by examiner

*Primary Examiner* — Vivek Srivastava
*Assistant Examiner* — Anthony Brown
(74) *Attorney, Agent, or Firm* — Thomas, Kayden, Horstemeyer & Risley, LLP

(57) ABSTRACT

Security is provided to a communication device configured to accept a physical key device. A public mode of operation is activated for the communication device when the physical key is not accepted by the personal communication device. The public mode of operation allows access to a first set of functions of the communication device, where the public mode of operation prohibits access to a second set of functions of the communication device. A personal mode of operation is activated for the communication device when the key is accepted by the personal communication device, where the personal mode of operation allows access to the first set of functions and the second set of functions of the communication device. A private mode may also be activated upon authentication of a user of the device, where the private mode allows access to a third set of functions. Other systems and methods are also provided.

15 Claims, 14 Drawing Sheets

SECURITY FOR A PERSONAL COMMUNICATION DEVICE

TECHNICAL FIELD

The present disclosure is generally related to communication devices and, more particularly, is related to communication device security.

BACKGROUND

Communication devices, such as cellular telephones and personal digital assistants, have developed to a point where these devices may be considered to be truly "personal devices" in that they contain information that is not necessarily intended for general viewing or utilization. For example, a cellular telephone may contain an address book with an owner or authorized user's personal business contacts, friends, family members, buddy lists, speed dialing settings, etc. The cellular telephone may also contain a calendar of the authorized user's activities. A web-enabled cellular telephone may contain bookmarks of web sites that the authorized user frequents. The authorized user may pay for services to be enabled on the telephone for a considerable fee. The cellular telephone may even be customized to display images, have customized ringer tones, etc. that are chosen by the authorized user. With all of this personal information and customizations being potentially accessible to anyone that operates a personal communication device, the authorized user of the device may be reluctant to let others use the personal communication device for even the most basic functions, such as making a local call, without the authorized user having some degree of control over what information or services are available.

Thus, a heretofore unaddressed need exists in the industry to address the aforementioned deficiencies and inadequacies.

SUMMARY

Embodiments of the present disclosure provide systems and methods for providing security to a communication device. Briefly described, one embodiment of the system, among others, can be described as follows. Security is provided to a communication device configured to accept a physical key device. A public mode of operation is activated for the communication device when the physical key is not accepted by the personal communication device. The public mode of operation allows access to a first set of functions of the communication device, where the public mode of operation prohibits access to a second set of functions of the communication device. A personal mode of operation is activated for the communication device when the key is accepted by the personal communication device, where the personal mode of operation allows access to the first set of functions and the second set of functions of the communication device. A private mode may also be activated upon authentication of a user of the device, where the private mode allows access to a third set of functions. In some embodiments, one or more biometric sensors are utilized with the communication device.

Embodiments of the present disclosure can also be viewed as providing methods for providing security to a communication device. In this regard, one embodiment of such a method, among others, can be broadly summarized by the following steps: detecting acceptance of a physical key to the communication device; activating a public mode of operation for the communication device when the physical key is detected to not be accepted, the public mode of operation allowing access to a first set of functions of the communication device, the public mode of operation prohibiting access to a second set of functions of the communication device; and activating a personal mode of operation for the communication device when the physical key is detected to be accepted, the personal mode of operation allowing access to the first set of functions and the second set of functions of the communication device.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of embodiments of the present disclosure. Moreover, in the drawings, like reference numerals designate corresponding parts throughout the several views.

DETAILED DESCRIPTION

Figure 1:
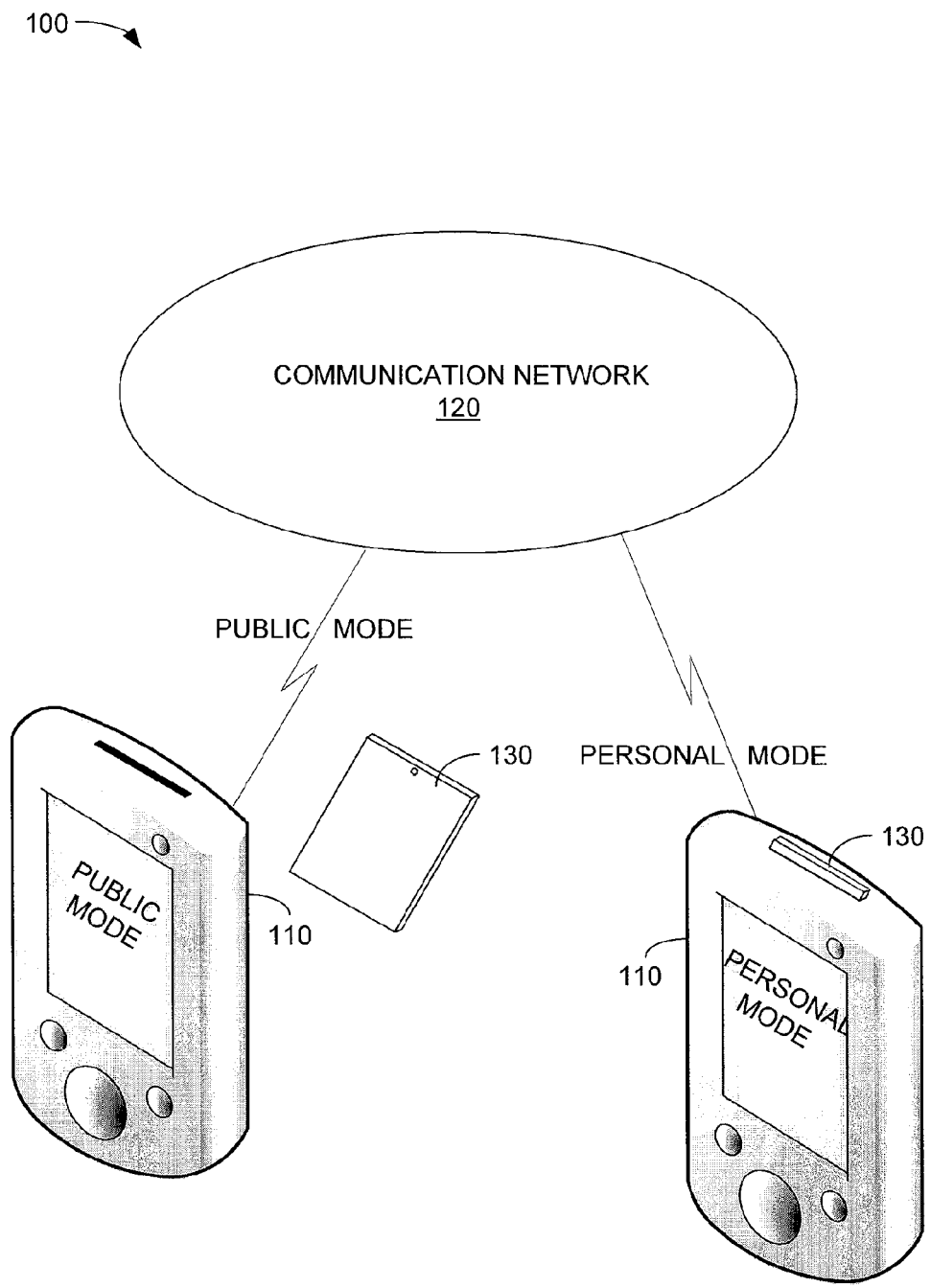
FIG. 1 is a block diagram of one embodiment of a communication system of the present disclosure.

FIG. 1 is a block diagram of one embodiment of a communication system 100 of the present disclosure. The communication system includes a personal communication device 110 that is coupled to a communication network 120. In FIG. 1, a single personal communication device 110 is shown, operating in different modes, for ease of illustration. However, it should be appreciated that any number of personal communication devices may be used.

The personal communication device 110 is a device that an operator uses for communication and may be configured in a preferred manner by the operator, in one embodiment. For example, an operator of the device 110 may select display options for how an interface screen of the device 110 is shown. Further, an operator may select volume levels, brightness levels, ringer tones, etc. that are preferred by the operator. Also, the device 110 may be configured to access information that is provided by the operator, such as a personal address book, calendar, transaction information, bookmarks, buddy lists, speed dialing settings, etc.

The communication network 120 is a network that is accessed by the personal communication device 110. In various embodiments, the personal communication device 110 may be a cellular telephone and a communication network 120 may be a cellular carrier communication network; the personal communication device 110 may be a personal digital assistant and the communication network 120 may be a private network accessed from the Internet; the personal communication device 110 may be a television remote control and the communication network 120 may be cable or satellite television carrier communication network, etc. In the case of the remote control and similar devices, the remote control communicates with a set top box which communicates with the communication network 120, such as a wireless or infrared local area network (LAN). Therefore, additional communication devices or components may be included in the system 100 between the devices or components shown in the figure.

Figure 2:
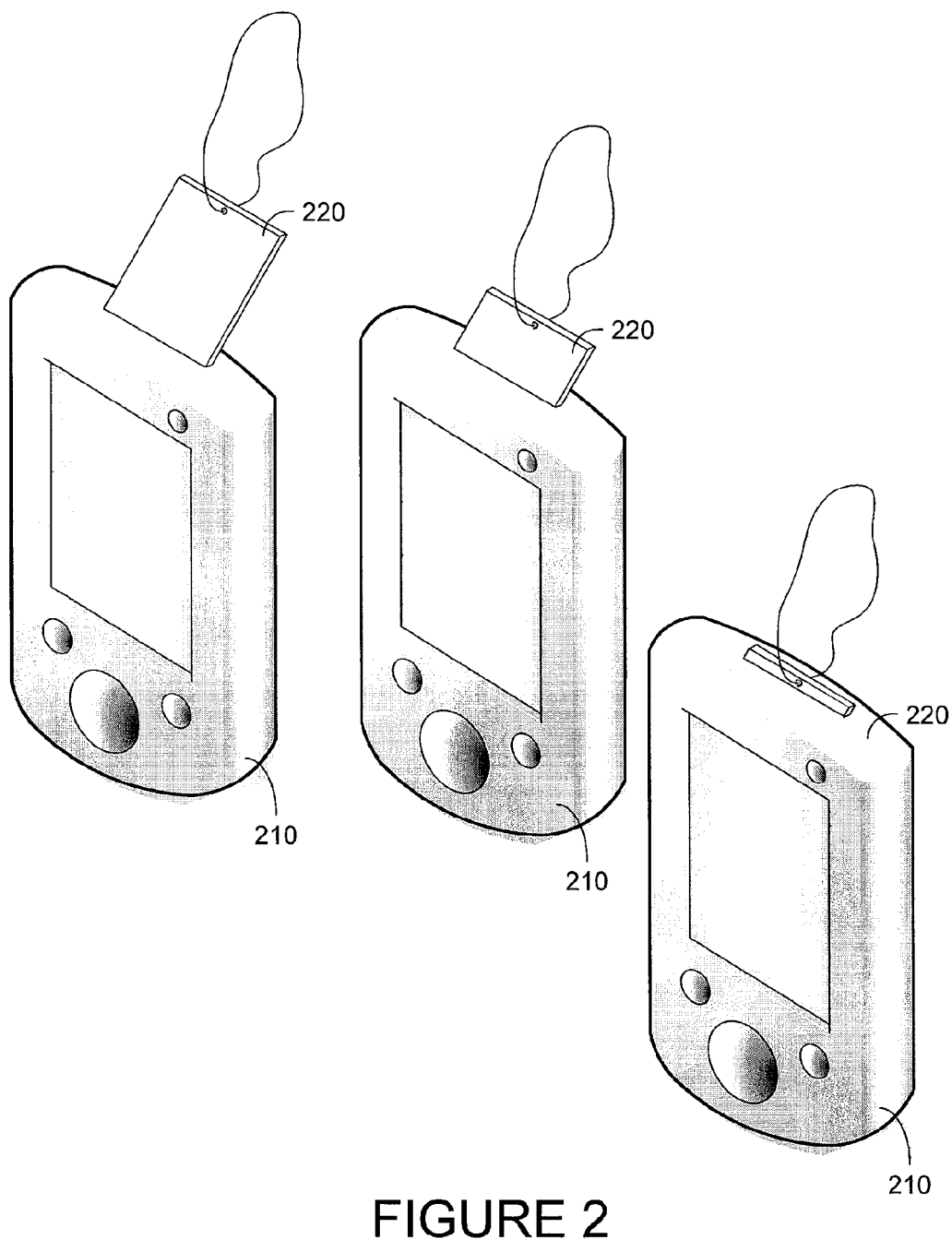
FIG. 2 is a diagram illustrating one embodiment of a physical key being inserted into a port or interface connection on a personal communication device, such as that shown in FIG. 1.

For the personal communication device 110, a physical key 130 is available to be connected to the device 110 (e.g., inserted into the personal communication device 110, accepted by the personal communication device 110, detected to be within range of the device, etc.). For example, FIG. 2 shows a physical key 220 being inserted into a port or interface connection located on the top of a personal communication device 210.

Such a physical security scheme is a difficult process to hack or obfuscate, if a unique physical key 130 is necessary to be present at the device, especially if authentication information is stored on the physical key itself or if biometric information is acquired. Information stored in the physical key, in some embodiments, may be encrypted using a public code (or key) that may then be decrypted using a private code (or key) that is stored within the personal communication device.

Without proper authentication and/or key confirmation, some embodiments institute a limited duration of functionality on the personal communication device 110. For example, a user may operate the personal communication device 110 at a limited capacity for a certain time limit or span. After which, the personal communication device 110 is completely disabled. Therefore, in the case of theft of the personal communication device 110, the device 110 will eventually become inoperable. Also, in some embodiments, a personal communication device 110 may periodically institute or initiate an authentication process to be sure that the user of a personal communication device in a personal mode of operation is the intended authorized user of the device.

To register a person as an authorized user for authentication purposes, the personal communication device may execute a locally stored application that prompts a user for authentication information during a set-up procedure, in some embodiments. Also, a web site interface or an interactive voice response system of the communication network 120 may be accessed by a user so that the user can provide requested information, and then authentication information may be transferred to the personal communication device 110 from the communication network 120. In some embodiments, a secured mode of operation is activated after a user is authenticated. Further, in some embodiments, biometric authentication techniques are used. A variety of biometric authentication techniques may be used, such as those involving iris scan, voice print, and/or thumb print recognitions.

Referring back to FIG. 1, after insertion of the physical key 130, the personal communication device activates a personal mode of operation, as shown in the personal communication device 110 on the right side of the figure. In some embodiments, an authentication process is implemented after insertion of the key 130 so that the present holder or user of the device may be authenticated as the authorized user or owner of the device 110. After the user has been authenticated, then the device 110 activates the personal mode of operation. In a personal mode of operation, all of the services, features, settings, and information set up by the user are enabled for the user's use. Further, in one embodiment, the communication network 120 is informed that the physical key 130 has been inserted into the device so that the communication network 120 can allow a personal mode of communication to be provided by the network 120. In some embodiments, different levels of authorized activities for different authorized users may exist. For example, there may be more modes than the "public" and "personal" modes discussed herein.

If the key 130 is removed from the personal communication device 110, the device automatically activates a public mode of operation, as illustrated in the personal communication device on the left side of the figure. During a public mode of operation, all of the services, features, and information set up by the owner or authorized user of the device are not enabled for use by the current holder or user of the device 110. It may be that only basic set of features are enabled for general use and only general information (as opposed to personal information) is available to be accessed. Further, in one embodiment, the communication network 120 is informed that the physical key 130 has not been inserted into the device. As a result, the communication network 120 allows a public mode of communication to be received by the personal communication device 110.

Authentication information may be provided to the communication network 120 if available or an indication that authentication information is not available may be provided to the network 120. For example, information may be provided that indicates that the user is unknown and as a result, the network 120 authorizes only its network to only be used for 911 calls by the personal communication device 110. It is understood that the types and levels of restrictions placed on a personal communication device within a public modes of operation and/or communication is a matter of configuring the personal communication device 110 or communication network 120 to function in a desired manner.

Figure 3:
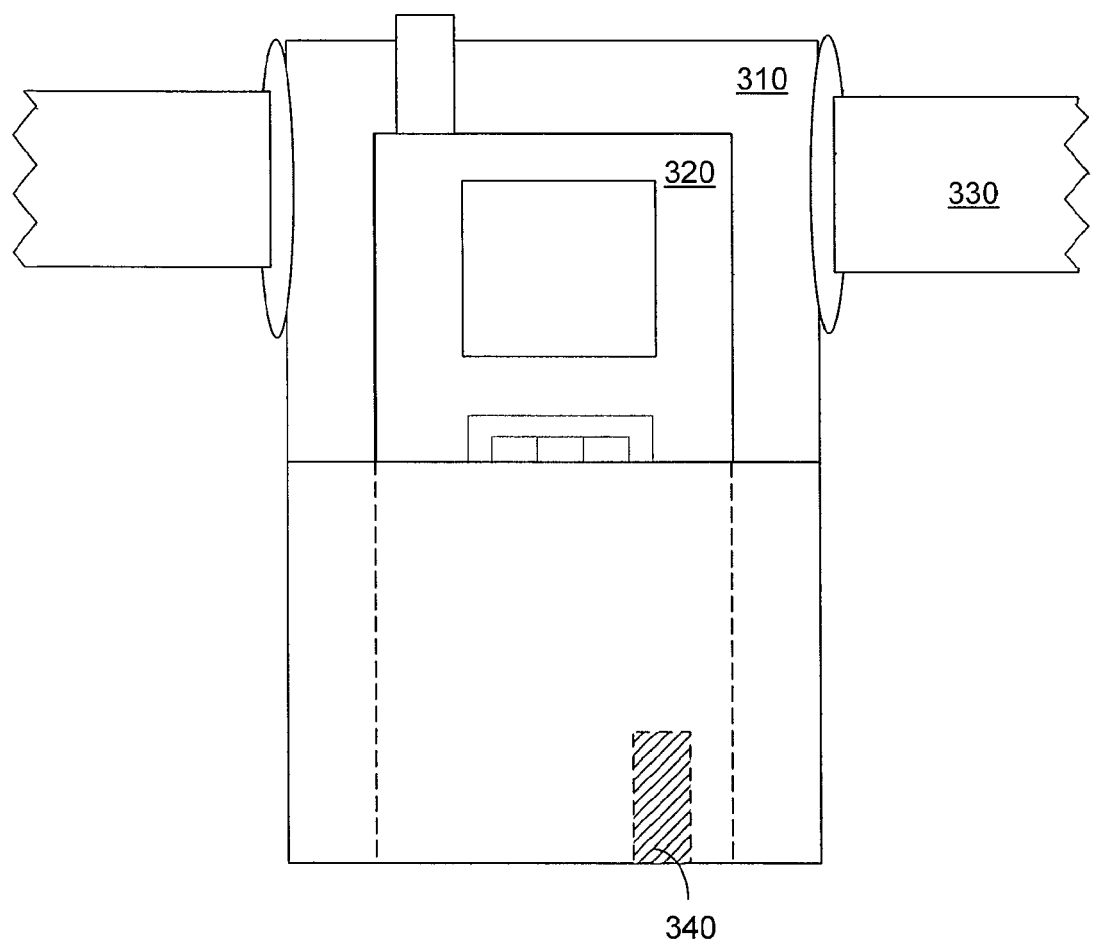
FIG. 3 is a diagram illustrating one embodiment of a physical key built in as part of a holster device for a personal communication device, such as that shown in FIG. 1.

Referring now to FIG. 3, in one embodiment, the physical key may be built in as part of a holster device 310 (or protective case) for the personal communication device 320. In the figure, the holster 310 is designed to fit around a piece of apparel, e.g., a belt 330, a pocket, etc. and has a key 340 built into the bottom of the inner portion of the holster with the key 340 extending towards the center of the holster 310. Therefore, the key 340 is not visible from looking at the exterior of the case. For convenience of the reader, the outline of the key 340 is represented in the figure. A personal communication device 320, when placed inside the holster, has an interface connection that is positioned to slide over the physical key 340 so that the key plugs into the personal communication device 320 as the device rests in the holster.

In accordance with an embodiment of the present disclosure, if the personal communication device 320 is a cellular telephone, when the cellular telephone 320 is in the holster 310 or case for the telephone 320, the telephone 320 has full capabilities at least to a certain extent for use of the authorized user's or owner's address book, for the authorized user's or owner's calling privileges, anything that the authorized user or owner would routinely do with his or her cell phone. When the cellular telephone is removed from the holster 310 or the key 340 is removed from it, then the cellular telephone 320 becomes a basic phone that could be used to make emergency calls to 911 and might be a shareable limited calling device for basic telephony. This is quite practical, particularly for the many people who now use wireless headsets and speech recognition for hands-free use of cell phones, making removal of the cell phone from the holster generally unnecessary. When removed from the holster and hence separated from the key, the device might be limited to local calls or to a certain number of minutes/call, in some embodiments.

For many, with calling plans having unlimited minutes or at least extensive minutes, having someone make a telephone call from one's personal cellular telephone may not be too intrusive or suspect, but allowing the person to have access to one's personal address book and other information that may be accessed from the telephone may be too intrusive a proposition for the owner of the telephone. Also, even with calling plans with many minutes, an owner may be worried about allowing another person to use his or her cellular phone by not knowing who is going to be called and for how long.

In one embodiment, multiple levels of security are provided by an embodiment of the communication system 100. For example, in one embodiment, one level is a public level of security, where the physical key 130 is not inserted or coupled with the personal communication device 110. Another is a personal level of security where the physical key 130 is inserted or coupled with the personal communication device 110 but a user is not authenticated. An additional level is a private level of security where the physical key 130 is inserted or coupled with the personal communication device 110 and the user has been authenticated. Also, there could be additional modes in different embodiments, e.g., if there are multiple levels of authentication.

Accordingly, in one embodiment, when the key 130 is not plugged into the personal communication device 110, limited functionality is enabled by the personal communication device 110. For example, if the personal communication device 110 is a cellular telephone device, the cellular telephone device may allow for telephone calls to be made with limited calling privileges, such as only local non-roaming calls may be made and no access to locally stored information is provided. Access to other functions or services such as the Internet or short messaging service (SMS) may also be disabled. Customized displays and audio tones may also be deactivated. This would allow loaning a cell phone to a friend or family member for temporary use.

As a minimum to access the disabled services and information, a physical key 130 is needed to be connected to the device 110 to unlock access to these features. In one embodiment, an authentication code is stored on the key 130 which is used to validate the key as belonging to the owner or authorized user of the device 110 and validates access to internal information on the device, such as an address book and maybe used to remove calling restrictions. Restrictions may be imposed by the personal communication device 110 itself or by the communication network 120 based upon whether the personal communication device is in a public mode of operation (e.g., proper key is not plugged into or accepted by the device) or a personal mode of operation (e.g., proper key is plugged into the device and any authentication process is completed). When the key 130 is connected, the restrictions are eliminated.

In some embodiments, the personal communication device 110 may implement a mode of operation based upon whether the key 130 of the owner or an authorized user is plugged into the device. For example, the personal communication device 110 may allow or disallow access to locally stored information based upon whether the key 130 is plugged into the device. Also, the communication network 120 may implement a mode of communication based on whether the key 130 of the owner is indicated to be plugged into the device 110. For example, the communication network 120 may allow roaming calls or Internet communications to be initiated based upon whether the key 130 is plugged into the personal communication device 110. In other words, the communication network 120 may grant full calling privileges to the user of the device 110 if the key is plugged into the device. Further, the personal communication device 110 may automatically log in the owner or authorized user of the device into medium security network sites once the key 130 is plugged into the device 110. Features that make the personal communication device "personal" in nature are limited until confirmation is received that the holder or user of the device is the owner or authorized user of the device.

In some environments, an embodiment of the personal communication device may be used as a transaction device with near-field communication (NFC) capabilities. A NFC-enabled personal communication device allows the authorized user to exchange and store data, including personal and financial data, if the personal communication device is enabled with a key and the personal communication device is in personal mode of operation (which may also require authentication of the user). For example, the authorized user may approach a vending machine with the NFC-enabled personal communication device. The vending machine initializes a connection to the personal communication device and communications between the personal communication device 110 and the vending machine commences. The authorized user may select a particular item shown in the vending machine and indicate the selection via his or her personal communication device 110. The personal communication device 110 communicates the selection to the vending machine. The vending machine may then communicate the transaction to a network entity that maintains a profile for the authorized user and debit the fee for the transaction from the user's account. Then, the vending machine dispenses the selected item to the user.

As mentioned above, an additional security level may also be included in some embodiments of the communication system 100. For example, if a financial transaction of some sort is attempting to be executed by accessing a particular application on the personal communication device 110, the application may ask for biometric confirmation of the identity of the holder or user of the device. While passwords and user codes may be input into the device 110, such codes and passwords may be obtained and input into the device by persons who are not the true owner or authorized user of the device. Also, a true owner or authorized user can lose or forget password and code information. Biometric information, such as a thumbprint, ocular characteristics, voice recognition, etc., may be used to confirm or disconfirm physical identity of the true owner or authorized user of the personal communication device as a strong authentication process.

Figure 4:
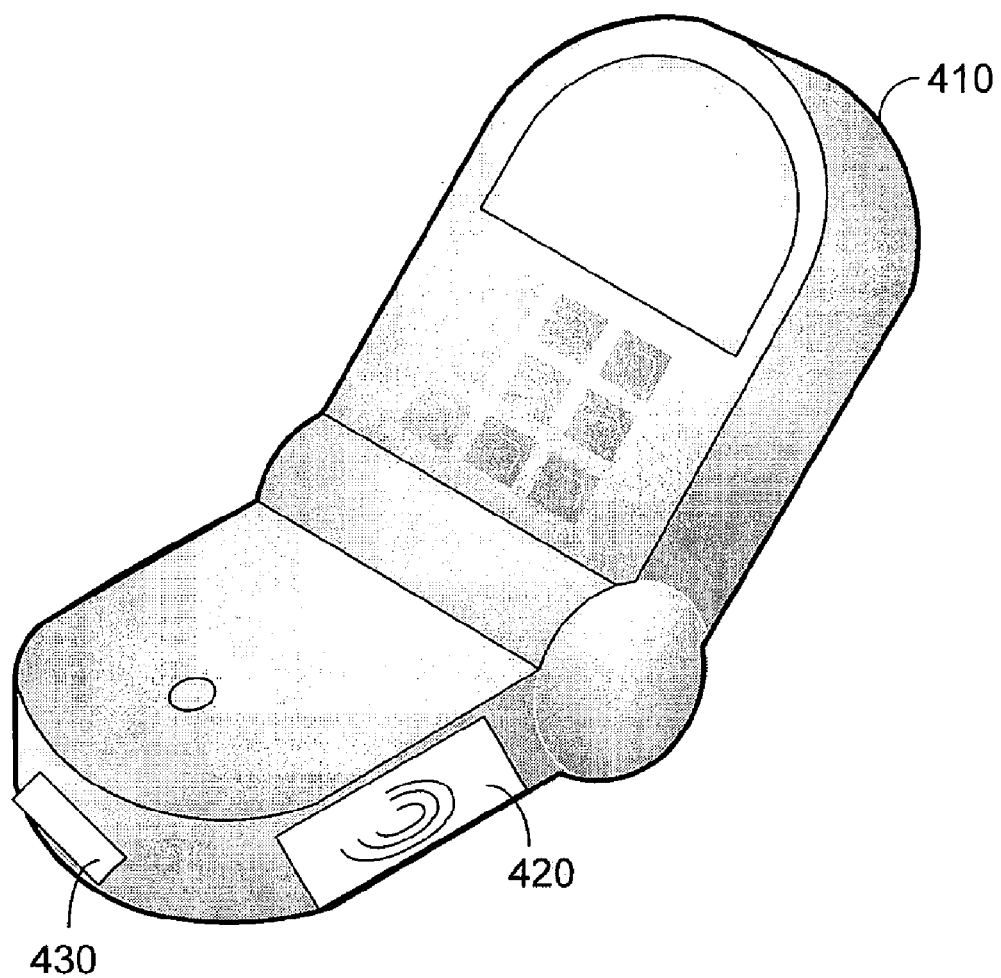
FIG. 4 is a diagram illustrating one embodiment of a fingerprint scanner built into a personal communication device, such as that shown in FIG. 1.

For example, in one embodiment illustrated in FIG. 4, a personal communication device 410 may have a fingerprint scanner 420 built into the device. By placing one's finger on the surface of the fingerprint scanner or sensor 420, a fingerprint authentication of a user may be performed. In some embodiments, the key 130 itself may house a biometric sensor.

Besides fingerprint scanning, other biometric tests may also be performed in other embodiments. For example, in one embodiment, voice recognition or authentication is based on recognizing characteristics of a user's voice. Upon authenticating a user as an owner or authorized user of a personal communication device 110, the device 110 is activated to allow full access privileges. Stored data within a microprocessor of the personal communication device 110 may implement the voice recognition procedures.

Figure 5A:
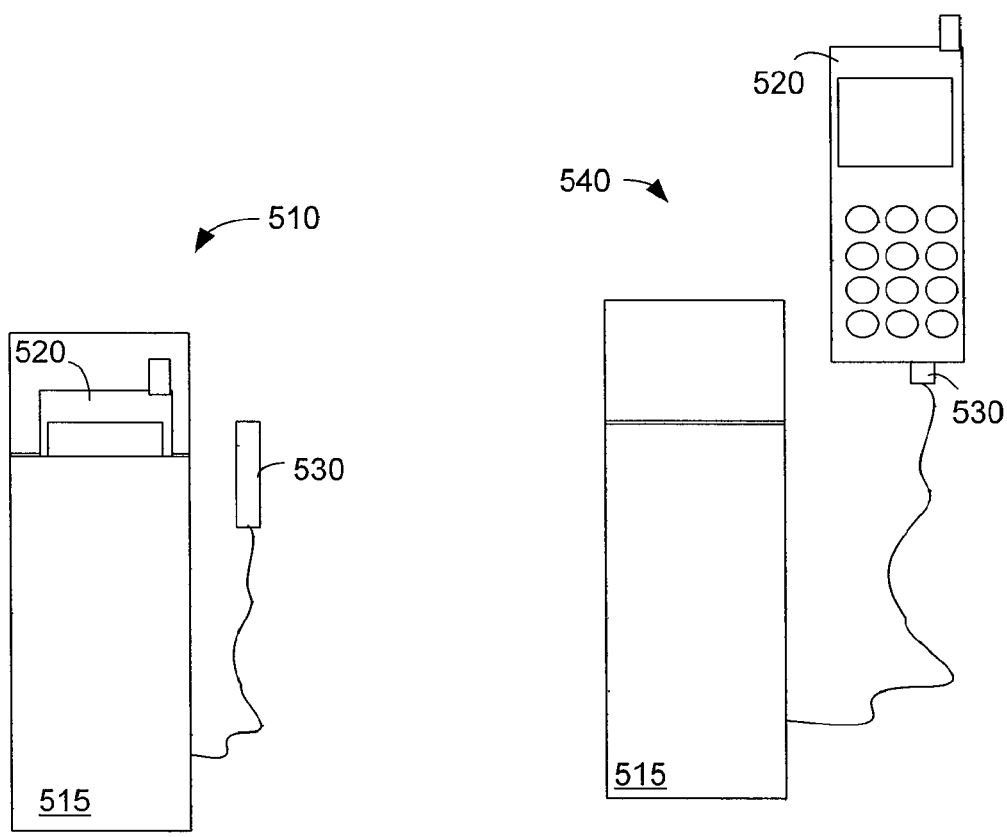
FIGS. 5A-5B are diagrams of embodiments of a process for authenticating a user of a personal communication device, such as that shown in FIG. 1.

One embodiment of a process for authenticating a user using an iris scan is depicted in FIG. 5A. Referring to the figure, in a first stage 510, a personal communication device 520 is shown in a case, and a key 530 is shown tethered to the case 515 but not plugged into the personal communication device 520. During this stage, the personal communication device 520 is in a public mode of operation. In the second stage 540, the key 530 is shown to be plugged into the personal communication device 520. Accordingly, the personal communication device is in a personal mode of operation. However, during this mode some services or functions that are attempted to be accessed by a user of the device 520 may require further authentication of the user to ensure that the operator of the device is an authorized user of the service or function attempting to be accessed.

Figure 5B:
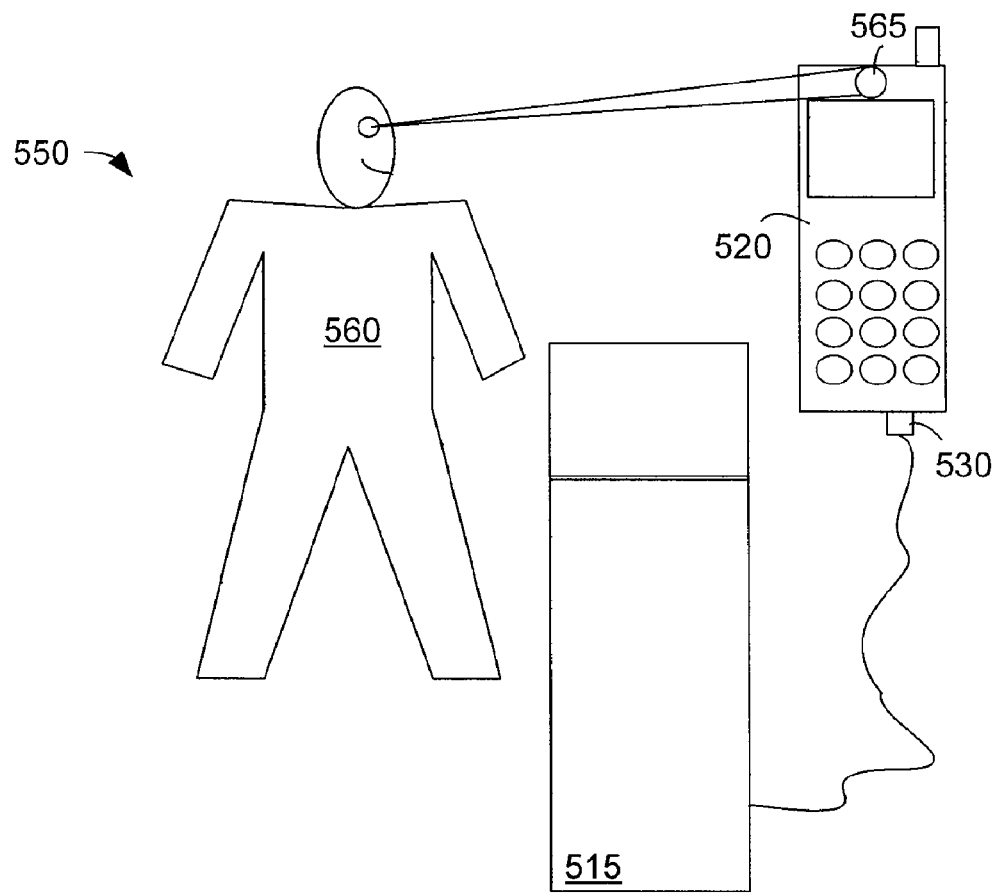

Therefore, in some embodiments, a process for authenticating a user using an iris scan may employ the approach shown in FIG. 5A as the first two stages of security with an additional stage of security shown in FIG. 5B. An iris scan of a user's eye examines the colored tissue surrounding the pupil of the eye which has more than 200 points that can be used for comparison, including rings, furrows and freckles.

Accordingly, in stage three 550, a user 560 is illustrated to be undergoing an iris scan authentication procedure by staring into a lens 565 of the personal communication device 520 that is implementing the procedure. If the personal communication device 520 determines that the holder or user of the personal communication device 520 is an authorized user, than the requested service or function will be performed.

In one embodiment, a way to control information stored on the personal communication device 110 is to store the information on the physical key device 130 itself. For example, the key 130 may be constitute a thumbdrive, a flashcard, or a secure media card that is easily unpluggable from the personal communication device 110. Additionally, information stored on the key device may unlock access to locally stored information that may be stored on the personal communication device 110.

While of the foregoing embodiments show a physical key being inserted or plugged into a personal communication device, embodiments of the present disclosure are not limited to the foregoing examples. For example, utilizing near-field communication technology, a physical key 130 may be detected by the personal communication device 110 within a certain range of the personal communication device 110, in some embodiments. As long as the personal communication device 110 remains in range of the physical key 130 and vice versa, a personal mode of operation is employed by the personal communication device 110. When the personal communication device 110 is out of range of the physical key 130, then the personal communication device 110 activates a public mode of operation.

Figure 6:
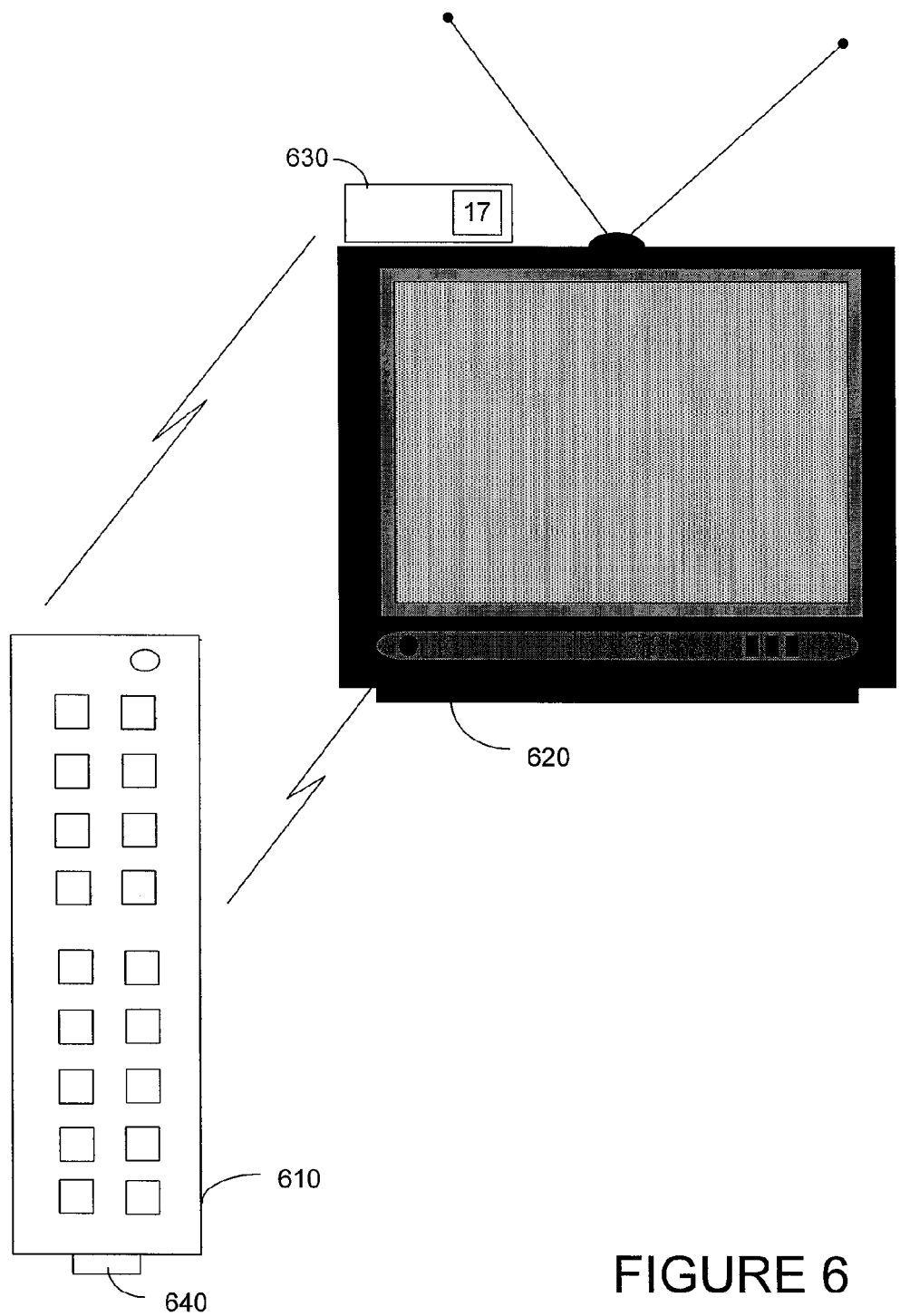
FIG. 6 is a diagram of one embodiment of communication system including a remote control type of a personal communication device.

A variety of types of personal communication devices 110 may be utilized in various embodiments. For example, FIG. 6 shows one embodiment utilizing a remote control type of personal communication device 610. It is noted that a television set 620 is generally considered a public communication medium in that many people may watch a television set 620 at the same time or share viewing privileges of a television set with others, such as visitors. Therefore, an authorized user of a television set 620 can customize settings, audio, available channels, and display characteristics of the television set 620 for his or her preferences when the user is privately viewing the television set 620 or is not concerned that his or her preferences/settings are also capable of being accessed by others.

For example, in a public mode of operation, a television set 620 may be configured to or a set top box 630 (shown to be tuned to channel 17) of a television set 620 may be configured to have parental access controls in effect so that premium cable channels are not available to viewers of the television set 620. Also, the television set 620 may be configured to not display caller-ID information of any incoming telephone calls on the telephone screen. However, by inserting a physical key 640 into a remote control of the television set (or set top box 630 connected to the television set 620), the television set 640 and/or set top box 630 may activate a personal mode of operation that unlocks access to premium channels, pay-per-view channels, and allows for caller-ID information to be displayed on the television screen 620. This may be done because the user is the only person currently watching the television set 620 and he or she does not care if caller-ID information is shown on the television screen. Note, in some embodiments, personal communication devices are multi-functional devices, such that a remote control unit 610 may also act as a cellular telephone. Therefore, a personal mode of operation for this type of remote control unit 610 may also allow for caller-ID information to be shown on the remote control unit 610, may allow for locally stored information to be accessed, require biometric information to be confirmed before allowing transactions to be facilitated by the television device 620 and/or set top box 630, etc. Further, the remote control unit 610 may be in communication with more than one device, such as the television set itself and a set top box 630, and/or other entertainment or communication devices.

Figure 7:
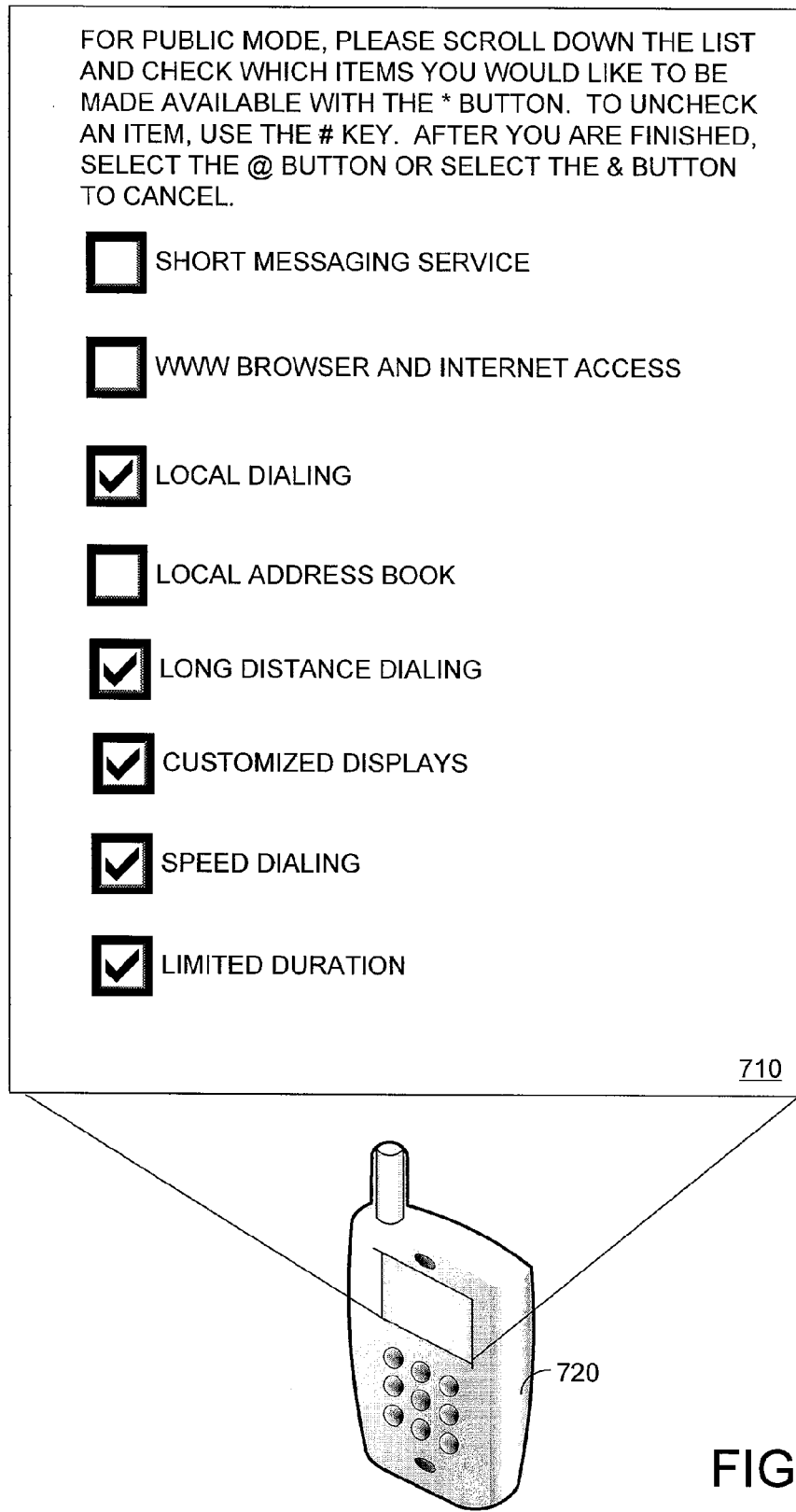
FIG. 7 is a diagram of one embodiment of a graphical screen that may be displayed by a personal communication device, such as that shown in FIG. 1.

To designate which services or functions are classified as one that should be offered during a public mode of operation or communication, in some embodiments, a graphical user interface is implemented by the personal communication device 110. To illustrate, FIG. 7 shows one embodiment of a graphical screen 710 that may be displayed by a personal communication device 720. In this example, an authorized user can select which features, settings, and/or services are to be available during a public mode of operation or communication by selecting checkboxes next to desired items. Other interfaces, variations, and approaches for designated such items are also contemplated and are included in other embodiments.

In one embodiment, an authorized user may have device settings which are designated as not being public. For example, a person that is hard of hearing may have to have the volume of the personal communication device 110 set at a high level. Therefore, if the person loans the personal communication device 110 to another, the volume setting may be protected from being changed by others during a public mode of operation for the device.

Figure 8:
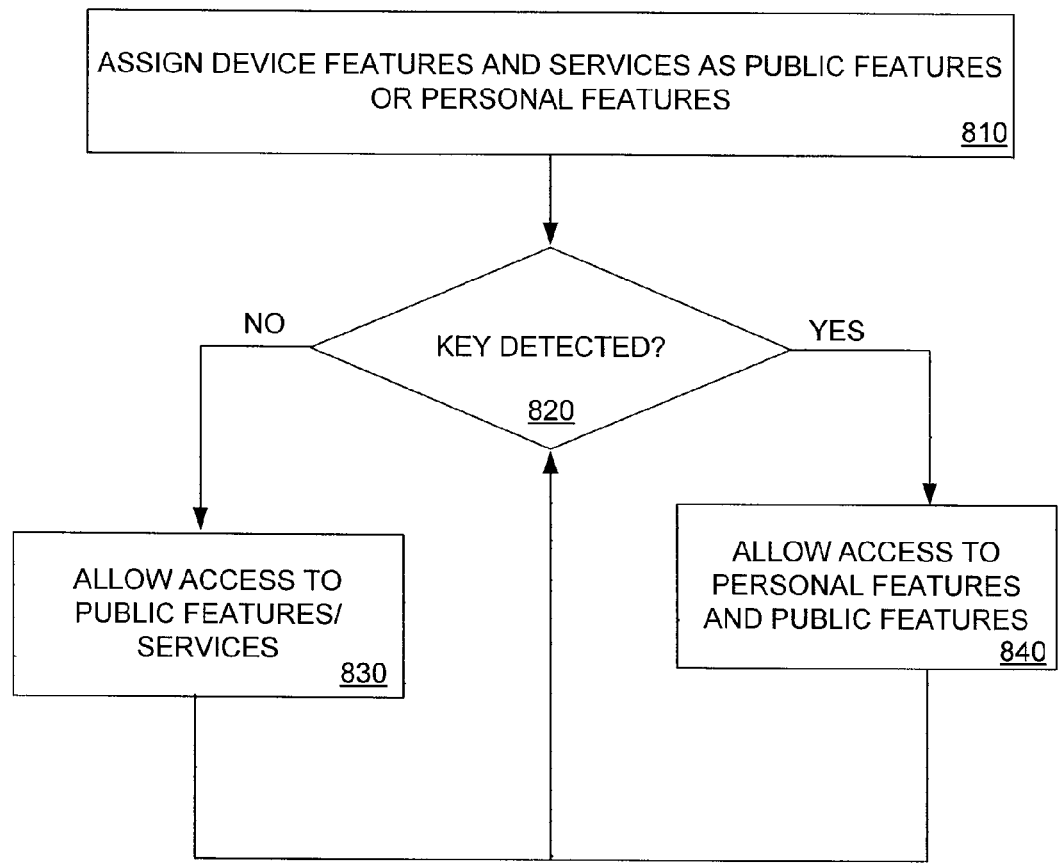
FIGS. 8-9 are flow charts describing embodiments, among others, of methods for providing personal security to a personal communication device, such as that shown in FIG. 1.

Referring now to FIG. 8, a flow chart describing one embodiment, among others, of a method for providing personal security to a personal communication device is shown. The method includes assigning (810) personal communication device features and services as public features or personal features. There are a variety of approaches that may be implemented to perform this step, including the approach illustrated in FIG. 7. It is noted that features that are not designated as public features or services may be construed as being personal features. The method further includes detecting (820) whether a physical key 130 is present in the personal communication device 110. If the key is not detected, then the device only allows (830) access to public features and services. If the key is detected, then the device allows (840) access to personal features and services. The process continues with continual or regular monitoring of the presence or lack of presence of the physical key 110.

Figure 9:
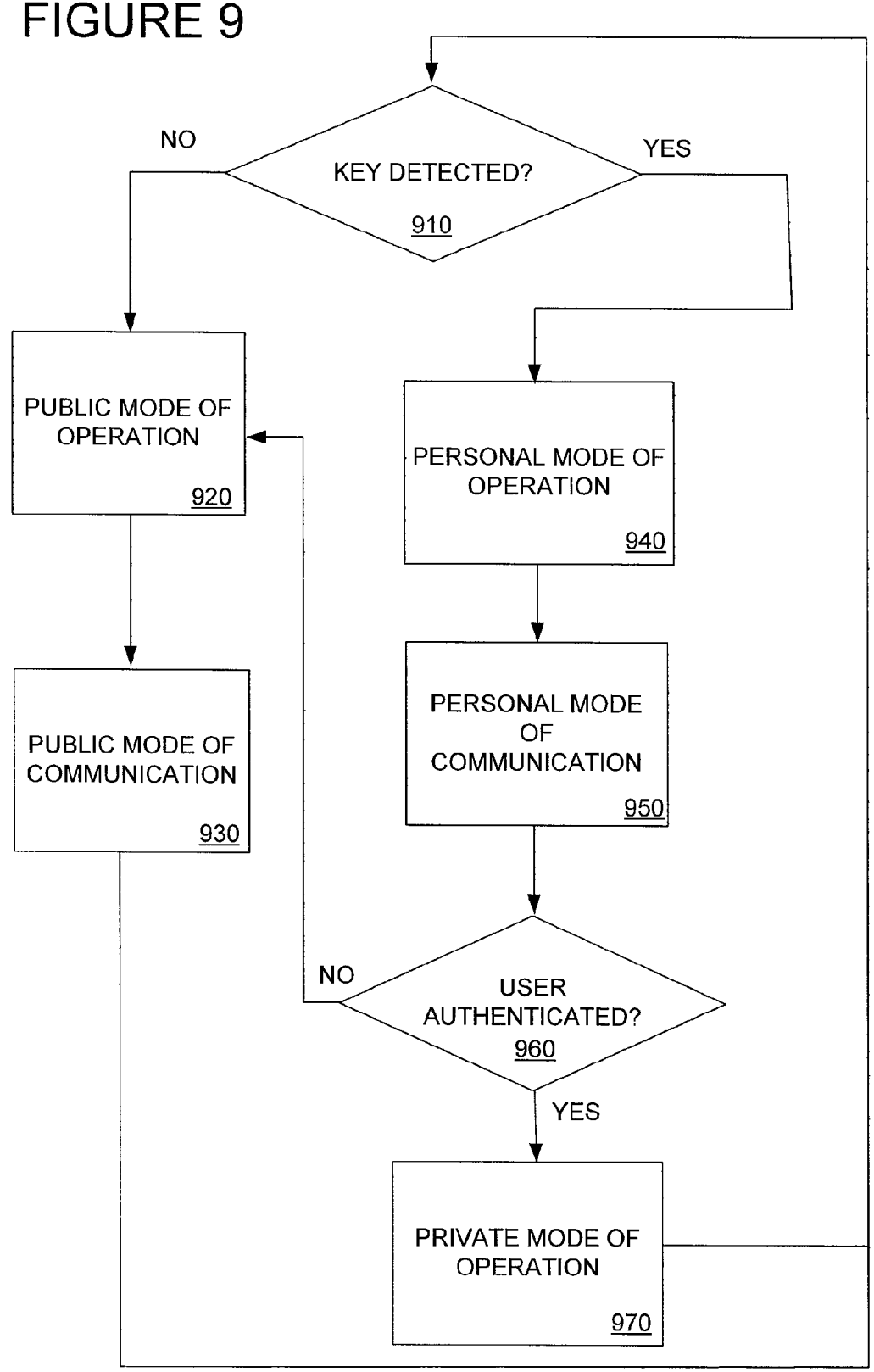

Referring now to FIG. 9, a flow chart describing one embodiment, among others, of a method for providing personal security to a personal communication device is shown. The method includes determining or detecting (910) whether a physical key is connected to the personal communication device. In some embodiments, a key 130 may be connected to the device by being physically inserted into the personal communication device 110. In other embodiments, a physical key 130 is connected to the device 110 by being within a defined range of the personal communication device 110. If the physical key 130 is not connected to the device 110 or if an invalid physical key is plugged into the device 110 (e.g., a key not belonging to the owner or an authorized user of the device), the personal communication device 110 activates (920) a public mode of operation. The communication network may also be informed (e.g., polling, in response to a query, periodic updating, etc.) of the status of the personal communication device 110 so that it may activate a public mode of communication (930). For example, in one embodiment, the communication network 110 may be informed by the personal communication device 110 when the network should assume a public mode of communication. Otherwise, a personal mode of communication is presumed to be desired. The public mode of operation enables access to services, functions, and information of the personal communication device that is of a general or non-personal nature to a user of the device 110 and available during a public mode of communication. Further, services and functions that are costly or have fees associated with them may not be provided to users other than the owner or authorized user.

If a valid physical key 130 is connected to the personal communication device 110, then the personal communication device 110 activates (940) a personal mode of operation. The communication network may also be informed (e.g., polling, in response to a query, periodic updating, etc.) of the status of the personal communication device 110 so that it may activate a personal mode of communication (950). For example, in one embodiment, the communication network 110 may be informed by the personal communication device 110 when the network should activate a personal mode of communication. Otherwise, a public mode of communication is informed by the act of not receiving instructions for initiating a personal (or private) mode. The personal mode of operation enables access to services, functions, and information of the personal communication device that are available to the owner or authorized user of the device, including services and functions for which the owner/authorized user has subscribed.

For some operations, the device attempts to confirm or authenticate (960) that the user of the device is the owner or authorized user of the personal communication device 110. In one embodiment, virtually all the information used by the personal communication device 110 is stored on the physical key 130 itself. Therefore, authentication is performed between the key 130 and the personal communication device 110 in one embodiment. In some embodiments, the key 130, the personal communication device 110, and biometric information collected on the personal communication device 110 is used to authenticate the user with the communication network 120. In some embodiments, the personal communication device 110 may be considered to be a relay point for communicating authentication information about the user to a control structure for authentication within the communication network 120, such as a system employing Internet Protocol Multimedia SubSystem (IMS) authentication using Diameter protocol.

Referring back to FIG. 9, if the current user of the device 110 is authenticated, a private mode of operation is activated (970). This mode, in some embodiments, is used for high security transactions such as purchases made with the personal communication device 110, access to financial transaction websites, etc., as compared to the personal mode with makes medium security features available to the user.

If the current user of the device 110 is not authenticated, then the personal communication device activates (920) a public mode of operation, as previously explained. In an alternative embodiment, the personal communication device could remain or stay in the personal mode if authentication fails. However, to maintain security, in some embodiments, the communication device reverts back to public mode.

The process continues with continual monitoring of the presence or lack of presence of the physical key 110 at the device. In some embodiments, the process is initiated, e.g., in response to the device being powered up.

Figure 10:
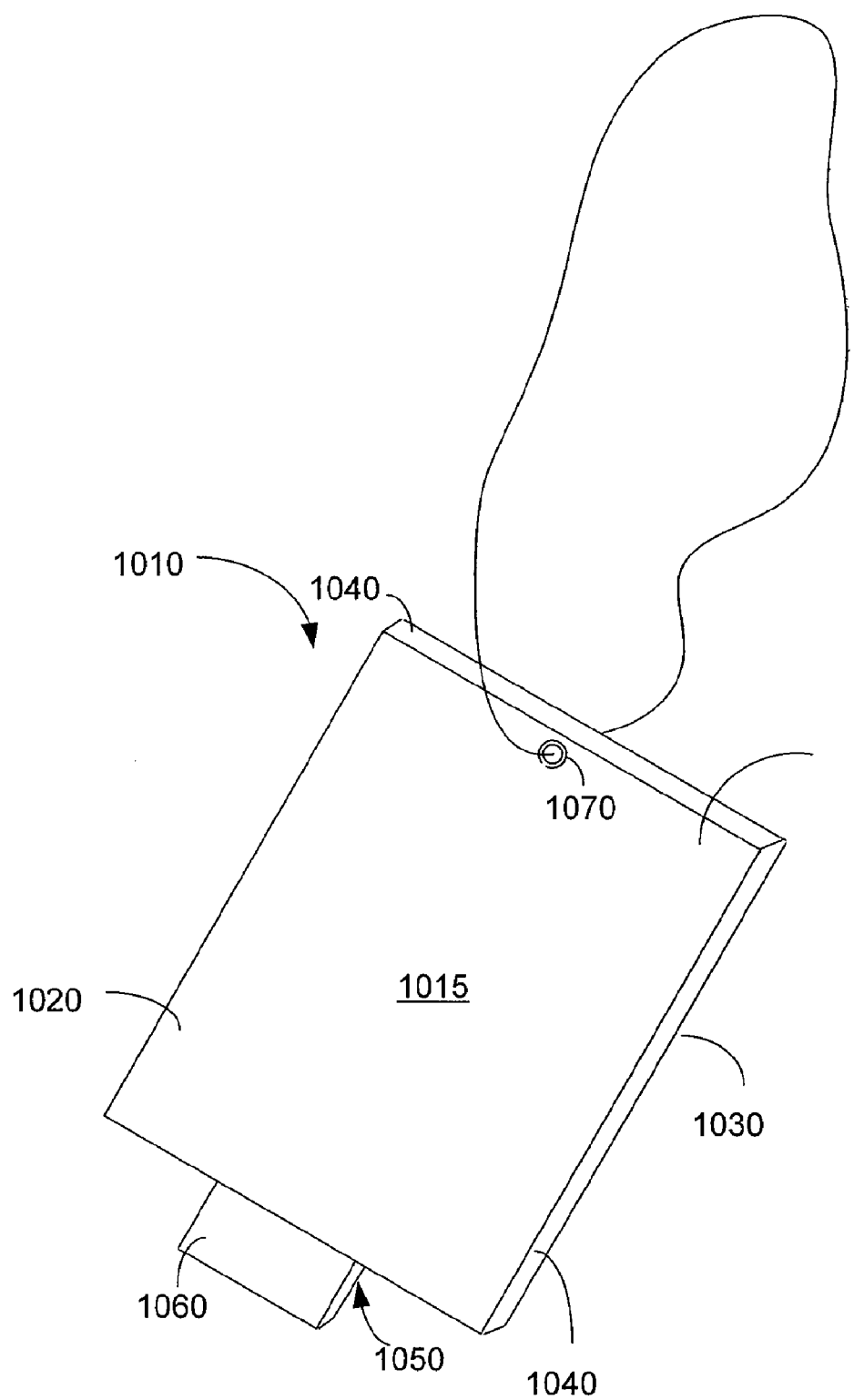
FIG. 10 is a diagram of a structure of one embodiment of a physical key, such as that shown in FIG. 1.

According to one embodiment, as shown in FIG. 10, a structure of a physical key 1010 includes a housing 1015 having upper 1020, lower 1030, and side walls 1040 forming a generally rectangular cross-section defining an elongated chamber having a front end opening 1050. A plug connector 1060 is mounted at a front end of the housing and is part of a substrate for circuitry that is housed inside the key 1010. A back end portion defines a mounting structure 1070 for a cord or chain that may be used to carry the physical key around a person's neck, wrist, clothing, etc. Inside the elongated chamber, circuitry having a memory portion is located to store information, such as authentication information for the authorized user and/or a unique code that corresponds to a code stored on the personal communication device for verification purposes. The plug connector 1060 is electrically connected to the circuitry through contacts and conductive traces that are formed on the circuitry, such as printed circuit board, using known techniques.

In one embodiment, the physical key 1010 is directed to pocket-sized, portable peripheral devices that are connected by plug connectors to personal communication devices 110 to enable various functions or services to be performed. It should be appreciated that physical key embodiments include pocket-sized computer peripheral device types that are readily transportable and which may be advantageously interconnected with various host personal communication devices or components. Examples of such personal communication devices include, but are not limited to, electronic computers of any type or size including, but not limited to, desktop computers (PC, Mac or other), notebook computers, palmtop computers, personal digital assistant (PDA) devices, cellular telephones, MP3 players, personal electronic devices, iPod devices, data communication devices, memory devices, etc.

The physical key 1010, in some embodiments, draws power directly from the power source of the personal communication device 110 once the key is plugged into the device. Accordingly, if memory information is stored in the key, the battery life of the personal communication device 110 may be extended since memory on the key 1010 does not need to be powered, except when the memory on the key 1010 is needed by the device 110.

Figure 11:
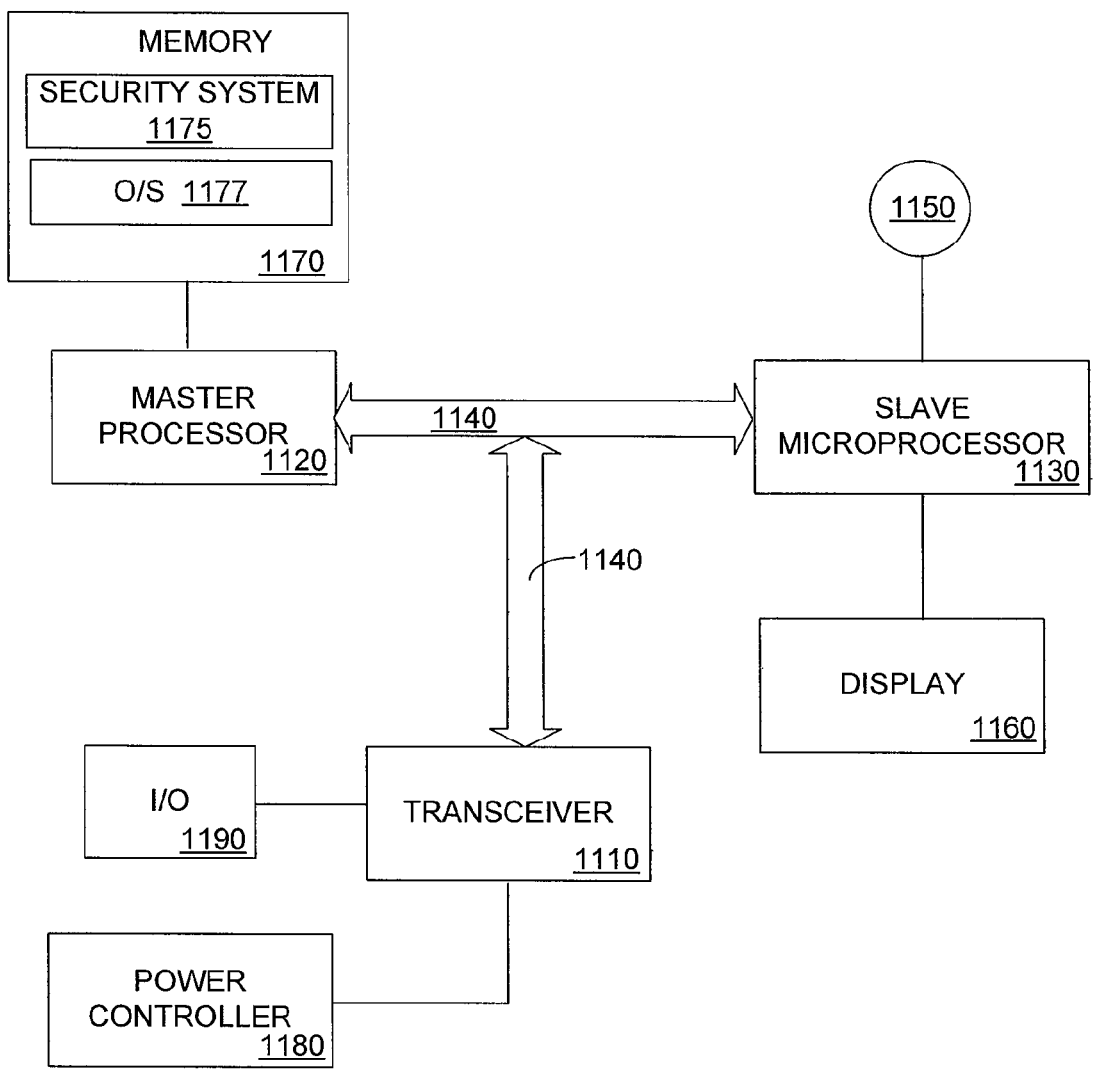
FIG. 11 is a block diagram of the electronic components for one embodiment of a personal communication device, such as that shown in FIG. 1.

The electronic components for one embodiment of a personal communication device is illustrated in FIG. 11. This electronics package generally includes a transceiver 1110, a master microprocessor 1120, and a slave microprocessor 1130, all connected by a data bus 1140. Input controls 1150 send a signal when pressed or activated to the slave microprocessor 1130 which in turn sends an interrupt signal to the master microprocessor 1120. The slave microprocessor 1130 enables a user to communicate with the master microprocessor 1120 and transceiver 1110. The slave microprocessor 1130 is coupled to the display 1160, and a power controller 1180 controls power to the electronics.

The master microprocessor 1120 controls the basic functions of the personal communication device 110 such as providing power up or power down, communicating with the communication network 120, and executing stored applications or software in memory 1170.

The software in memory 1170 may include one or more separate programs, each of which includes an ordered listing of executable instructions for implementing logical functions. In the example of FIG. 11, the software in the memory 1170 includes a security system 1175 for implementing a process similar to that depicted in flowcharts of FIGS. 8 and 9 and a suitable local operating system (O/S) 1177. The operating system 1177 controls the execution of other computer programs, such as the scheduling system 1175, and provides scheduling, input-output control, file and data management, memory management, and communication control and related services.

The security system 1175 is a source program, executable program (object code), script, or any other entity comprising a set of instructions to be performed. When a source program, then the program needs to be translated via a compiler, assembler, interpreter, or the like, which may or may not be included within the memory 1170, so as to operate properly in connection with the O/S 1177. Furthermore, the security system 1175 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The transceiver 1110 transmits and receives communications, such as cellular communications in the case of a wireless telephone. The transceiver 1110 is coupled to input/output (I/O) devices or controls 1190, such as a microphone for voice communications or a speaker that is configured to convert received transmissions into audible sound. Accordingly, I/O devices 1190 may include input devices, for example but not limited to, a keyboard, mouse, scanner, microphone, etc. Furthermore, the I/O devices 1190 may also include output devices, for example but not limited to, a printer, display, etc. Finally, the I/O devices 1190 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The security system 1175 which includes an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of embodiments of the present disclosure in logic embodied in hardware or software-configured mediums.

In an alternative embodiment, where the security system 1170 is implemented in hardware, the security system 1170 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 12:
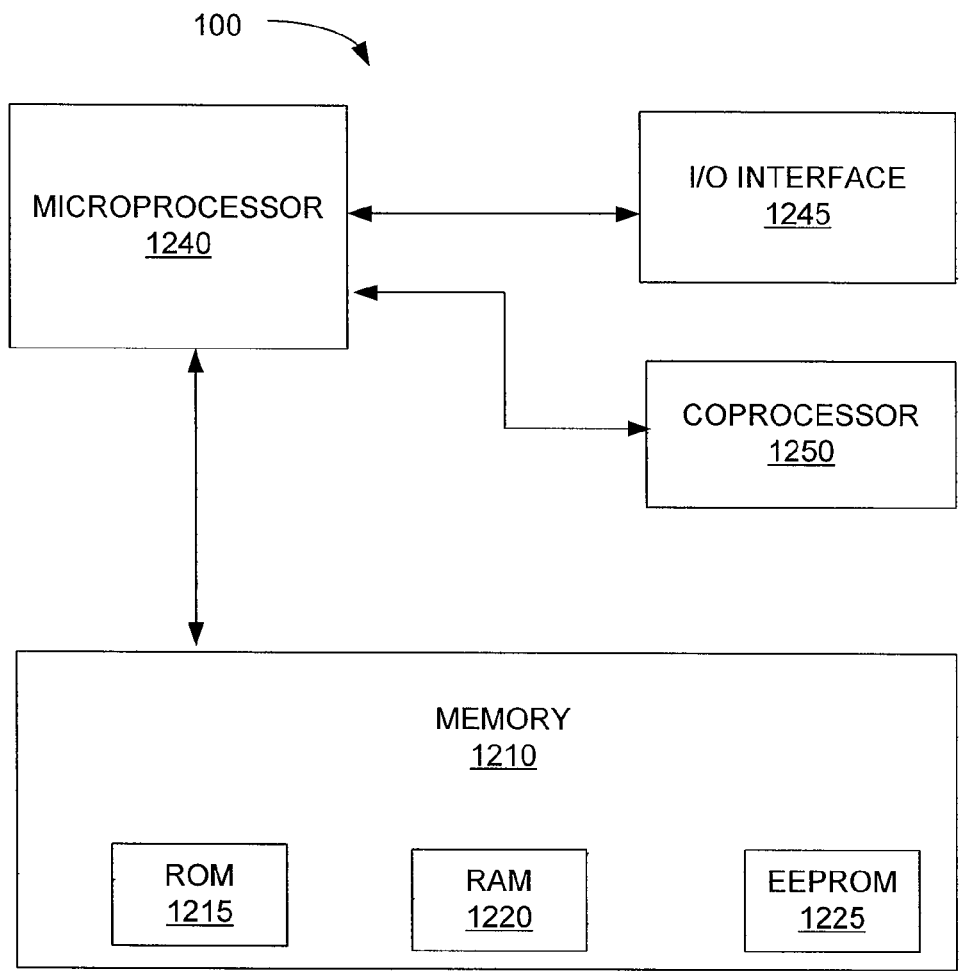
FIG. 12 is a block diagram of the electronic components for one embodiment of a physical key device, such as that shown in FIG. 1.

FIG. 12 shows one embodiment of a physical key 1200. For various embodiments, the key 1200 could be in the form of a smart card, compact flash card, secure digital media card, or a USB thumb drive, among others. The key 1200 includes memory 1210 that may include one or more of the following: ROM 1215, EEPROM 1225, and RAM 1220. The ROM and/or EEPROM generally include software, which is executed by microprocessor 1240. The software includes instructions that implement and/or manage protocols and cryptographic keys involved in decrypting content. Because cost, memory, and I/O bandwidth limits make it difficult to decrypt a large amount of data in the physical key module, the physical key can supply content decryption keys for individual blocks or streams of content to the personal communication device 110, which performs the bulk data decryption. A cryptographic processor 1250 can optionally assist with the cryptographic computations by reducing the amount of time or program code required for the computation or by implementing obfuscated algorithms that are difficult to reverse engineer. I/O interface 1245 is provided for communications with the personal communication device 110.

Figure 13:
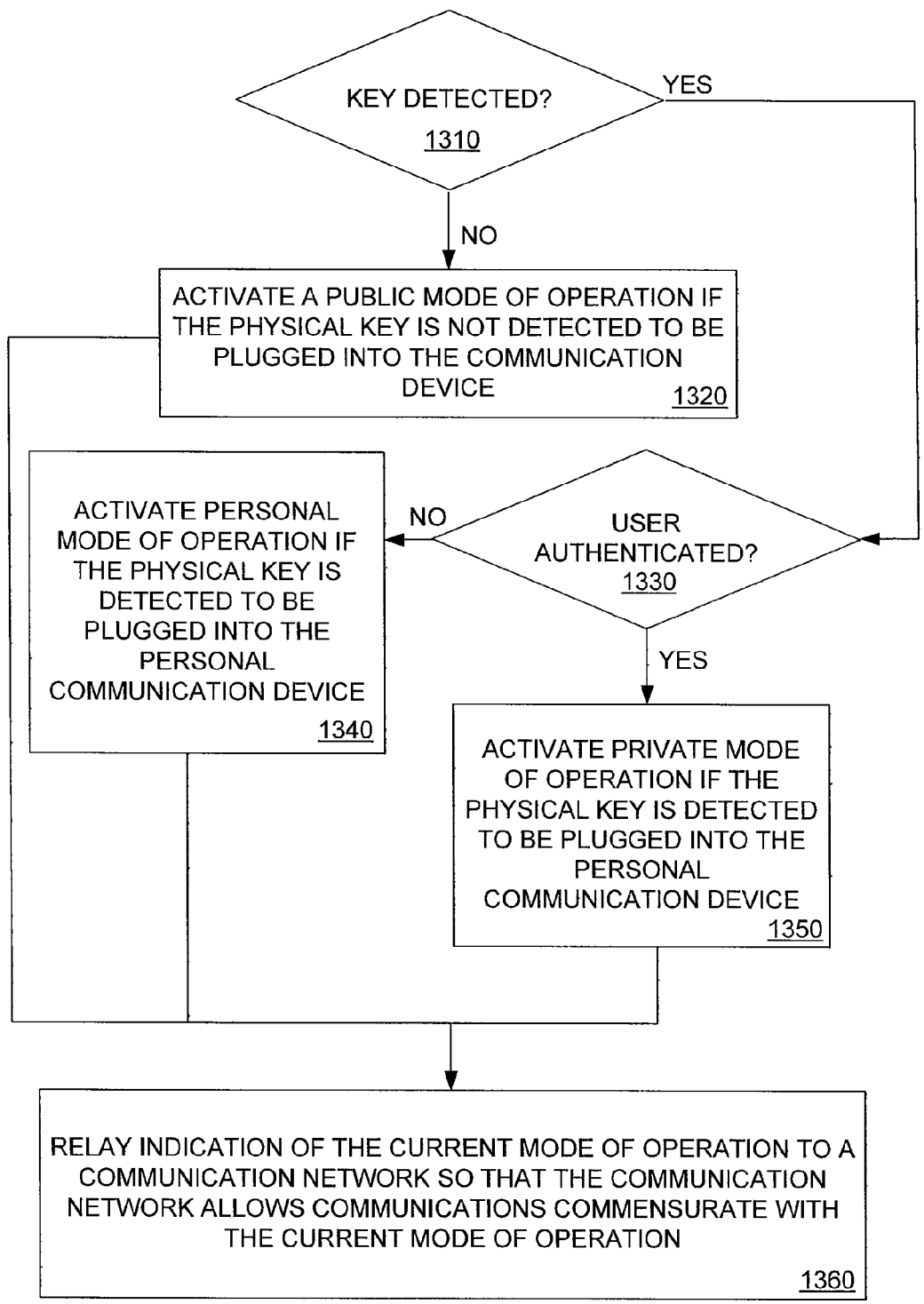
FIG. 13 is a flow chart describing one embodiment of a method for securing a communication device, such as that shown in FIG. 1.

Advantageously, with the embodiments of the present disclosure, an owner or authorized user of a communication device can maintain a degree of control over what information or services are available on the device when it is not being operated by that user. Referring now to FIG. 13, an additional embodiment of a method for securing a communication device is described. The method includes detecting (1310) whether a physical key 130 is plugged into the communication device 110. If the physical key 130 is not detected to be plugged into the communication device 110, a public mode of operation is activated (1320). Accordingly, if the physical key 130 is detected to be plugged into the personal communication device 110 and the user is not authenticated (1330) as an authorized user, where, e.g., the physical key 130 stores authentication information for the authorized user that is used to authenticate the user, then a personal mode of operation is activated (1340). The personal mode of operation allows for services and functions to be utilized by an operator of the device 110 that are not available during the public mode of operation.

If the user of the personal communication device 110 is authenticated (1330) and the physical key 130 is currently plugged into the communication device 110, then a private mode of operation is activated (1350). For example, some applications or operations requested to be performed by a user require authentication of the user before being performed.

An indication of the current mode of operation is relayed (1360) to a communication network 120 so that the communication network 120 allows communications commensurate with the current mode of operation. For example, if the communication device 110 is in a public mode of operation, then the communication network 120 activates a public mode of communication. Likewise, if the communication device 110 is in a personal mode of operation or private mode of operation, then the communication network 120 activates a personal mode of communication or private mode of communication (e.g., encrypted transmissions).

Any process descriptions or blocks in flow charts should be understood as representing modules, segments, or portions of code which include one or more executable instructions for implementing specific logical functions or steps in the process, and alternate implementations are included within the scope of the disclosure in which functions may be executed out of order from that shown or discussed, including substantially concurrently or in reverse order, depending on the functionality involved, as would be understood by those reasonably skilled in the art.

It should be emphasized that the above-described embodiments are merely possible examples of implementations, merely set forth for a clear understanding of the principles of the present disclosure. Many variations and modifications may be made to the above-described embodiments without departing substantially from the spirit and principles of the present disclosure. All such modifications and variations are intended to be included herein within the scope of this disclosure.

Therefore, at least the following is claimed:

1. A security system for a personal communication device, comprising:
    a physical interface to the personal communication device configured to accept a physical key device for the personal communication device, wherein the physical key device is unique and individual to the personal communication device; and
    logic of the personal communication device configured to activate a public mode of operation for the personal communication device when the physical key device is not accepted by the personal communication device, the public mode of operation allowing access to a first set of functions of the personal communication device, the public mode of operation prohibiting access to a second set of functions of the personal communication device, the logic further configured to activate a personal mode of operation for the personal communication device when the physical key device is accepted by the personal communication device, the personal mode of operation allowing access to the first set of functions and the second set of functions of the personal communication device;
    logic of the personal communication device configured to automatically deactivate the public mode of operation after a set time period has expired when the physical key device is removed from the personal communication device,
    wherein the second set of functions comprises device feature settings previously set by a user of the personal communication device to be activated for the personal mode of operation; and
    the logic is further configured to relay to a communication network that the physical key device is not accepted by the personal communication device, wherein the communication network initiates a public mode of communication with the personal communication device when the physical key device is not accepted by the personal communication device, the public mode of communication allowing some forms of communication and prohibiting other forms of communication that are allowed during a personal mode of communication, the personal mode of communication being activated by the communication network when the public mode of communication is not being employed,
    wherein the personal communication device comprises a remote control to at least one of a television set and a television set top box.

2. The system of claim 1, wherein the physical key device is an electronic device.

3. The system of claim 1, further comprising:
    a graphical user interface to the personal communication device configured to prompt the user to select which features of the personal communication device are designated as being accessible during a public mode of operation.

4. The system of claim 1, wherein the logic of the personal communication device is further configured to activate a private mode of operation that allows access to functions that require authentication of the user of the personal communication device when the physical key is accepted by the personal communication device and the user has been authenticated by the personal communication device, wherein the private mode of operation is a mode of operation in addition to the public mode of operation and the personal mode of operation.

5. The system of claim 4, further comprising:
    a biometric sensor built into the personal communication device, wherein the logic is configured to authenticate whether the user of the personal communication device is a particular identity using the biometric sensor and to activate the private mode of operation in response to a positive identification of the user.

6. The system of claim 1, wherein the physical key device is built into a protective case for the personal communication device.

7. A method for providing security to a communication device comprising:
    detecting acceptance of a physical key by the communication device, wherein the physical key is unique and individual to the communication device;
    activating a public mode of operation for the communication device when the physical key is detected to not be accepted, the public mode of operation allowing access to a first set of functions of the communication device, the public mode of operation prohibiting access to a second set of functions of the communication device;

automatically deactivating the public mode of operation after a set time period has expired when the physical key is removed from the communication device;

activating a personal mode of operation for the communication device when the physical key is detected to be accepted, the personal mode of operation allowing access to the first set of functions and the second set of functions of the communication device, wherein the second set of functions comprises device feature settings previously set by a user of the communication device to be activated for the personal mode of operation; and relaying to a communication network that the physical key is not accepted by the communication device, wherein the communication network initiates a public mode of communication with the communication device when the physical key is not accepted by the communication device, the public mode of communication allowing some forms of communication and prohibiting other forms of communication that are allowed during a personal mode of communication, the personal mode of communication being activated by the communication network when the public mode of communication is not being employed, wherein the communication device comprises a remote control to at least one of a television set and a television set top box.

8. The method of claim 7, further comprising:
prompting the user to select which features of the communication device are designated as being accessible during a public mode of operation.

9. The method of claim 7, further comprising:
activating a private mode of operation that allows access to functions that require authentication of the user of the communication device, wherein the private mode of operation is a mode of operation in addition to the public mode of operation and the personal mode of operation.

10. The method of claim 9, further comprising:
biometrically authenticating whether the user of the communication is an authorized user of the communication device.

11. The method of claim 7, wherein the physical key is regarded as being accepted if the physical key is within range of being detected by the communication device using near field detection technology.

12. The method of claim 7, wherein the public mode of operation prohibits device settings for the communication device from being changed by the user of the communication device, the device settings comprising at least a volume setting and designation of which capabilities are accessible to public users.

13. The method of claim 7, further comprising:
storing information in the physical key that is accessed during a personal mode of operation by the communication device.

14. A security system for a communication device, comprising:

an electronic physical key for a personal communication device, the physical key configured to enable a public mode of operation to be activated in the personal communication device when the physical key device is not accepted by the personal communication device, the public mode of operation allowing access to a first set of functions of the personal communication device, the public mode of operation prohibiting access to a second set of functions of the personal communication device, the physical key further configured to enable activation of a personal mode of operation for the personal communication device when the physical key is accepted by the personal communication device, the personal mode of operation allowing access to the first set of functions and the second set of functions of the personal communication device, wherein:

the physical key is unique and individual to the personal communication device;

the second set of functions comprises device feature settings previously set by a user of the personal communication device to be activated for the personal mode of operation; and the personal communication device relays to a communication network that the physical key device is not accepted by the personal communication device, wherein the communication network initiates a public mode of communication with the personal communication device when the physical key device is not accepted by the personal communication device, the public mode of communication allowing some forms of communication and prohibiting other forms of communication that are allowed during a personal mode of communication, the personal mode of communication being activated by the communication network when the public mode of communication is not being employed, wherein the personal communication device automatically deactivates the public mode of operation after a set time period has expired when the physical key is removed from the communication device, wherein the personal communication device comprises a remote control to at least one of a television set and a television set top box.

15. The system of claim 14, wherein the physical key is further enabled to a private mode of operation to be activated in the personal communication device when the physical key is accepted by the personal communication device and a user has been authenticated by the personal communication device, wherein the private mode of operation is a mode of operation in addition to the public mode of operation and the personal mode of operation.

* * * * *